(12) United States Patent
Ishida et al.

(10) Patent No.: US 7,057,315 B2
(45) Date of Patent: Jun. 6, 2006

(54) AUTOMOTIVE ALTERNATOR HAVING COOLING FAN COUPLED TO ROTOR SHAFT

(75) Inventors: Hiroshi Ishida, Anjo (JP); Masao Ichikawa, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/137,422

(22) Filed: May 26, 2005

(65) Prior Publication Data

US 2005/0285459 A1   Dec. 29, 2005

(30) Foreign Application Priority Data

Jun. 28, 2004   (JP)   ............................. 2004-189055

(51) Int. Cl.
*H02K 9/06*   (2006.01)
(52) U.S. Cl. .................. 310/59; 310/58; 310/60 R; 310/232; 310/263
(58) Field of Classification Search .............. 310/263, 310/62, 63, 58
See application file for complete search history.

(56) References Cited

U.S. PATENT DOCUMENTS

| | | | |
|---|---|---|---|
| 5,325,003 A * | 6/1994 | Saval et al. ................... | 310/43 |
| 5,459,364 A | 10/1995 | Rondier | |
| 5,625,244 A * | 4/1997 | Bradfield ..................... | 310/232 |
| 6,586,853 B1 * | 7/2003 | Ishida et al. ................. | 310/62 |
| 6,707,181 B1 * | 3/2004 | Militello et al. .............. | 310/63 |
| 6,812,602 B1 * | 11/2004 | York .......................... | 310/62 |

FOREIGN PATENT DOCUMENTS

| | | |
|---|---|---|
| JP | Y2-05-008781 | 3/1993 |
| JP | B2-3497896 | 11/2003 |

* cited by examiner

*Primary Examiner*—Burton Mullins
(74) *Attorney, Agent, or Firm*—Oliff & Berridge, PLC

(57) ABSTRACT

An alternator for use in an automobile includes a stator supported between a front housing and a rear housing, and a rotor connected to a rotor shaft and rotatably supported inside the stator. A cooling fan is positioned at an end of a pole core of the rotor. The cooling fan is coupled to the rotor shaft by engaging edges of a center opening of the cooling fan with a non-circular flange formed on the rotor shaft. The cooling fan is correctly positioned relative to the rotor shaft, without using a jig, both in the radial direction and in the rotational direction of cooling fan. Noises and vibrations due to rotational imbalance of the cooling fan are suppressed.

11 Claims, 5 Drawing Sheets

FRONT SIDE ← → REAR SIDE

AUTOMOTIVE ALTERNATOR HAVING COOLING FAN COUPLED TO ROTOR SHAFT

CROSS-REFERENCE TO RELATED APPLICATION

This application is based upon and claims benefit of priority of Japanese Patent Application No. 2004-189055 filed on Jun. 28, 2004, the content of which is incorporated herein by reference.

BACKGROUND OF THE INVENTION

1. Field of the Invention

The present invention relates to an alternator used in an automotive vehicle.

2. Description of Related Art

In a conventional alternator, a cooling fan connected to a rotor shaft generates airflows in an axial direction for cooling a field winding and in a radial direction for cooling coil ends of an armature winding. In some alternators, a fan base for rectifying directions of the airflows is disposed between an end of a pole core and the cooling fan. JP-B2-3497896 discloses such an alternator that includes a slip-ring molded together with terminals for electrically connecting a slip-ring to a field winding. In this alternator, a rotor shaft is forcibly inserted into a center hole of the molded slip-ring.

In an alternator having a cooling fan, the cooling fan has to be connected to a rotor shaft coaxially and at a correct position in a rotational direction of the rotor shaft. If the cooling fan is not coaxially connected to the rotor, fan noises will be generated according to rotation of the cooling fan. It is also important to be able to connect the cooling fan and the fan base to the rotor at a right position in a simple process. For connecting a cooling fan coaxially to a rotor shaft in a simple process, JP-Y2-5-8781 proposes an alternator, in which a fan base is mechanically connected to a cooling fan and a fringe of a center hole of the cooling is engaged with the rotor shaft.

In the alternator proposed by JP-Y2-5-8781, however, the cooling fan may not be correctly positioned in the rotational direction though it can be coaxially connected to the rotor shaft. If the cooling fan is not correctly positioned in the rotational direction relative to the fan base or the pole core, welding between the cooling fan and the fan base may not be successfully performed. Therefore, it has been required to use an additional jig for correctly positioning the cooling fan in the rotational direction.

SUMMARY OF THE INVENTION

The present invention has been made in view of the above-mentioned problems, and an object of the present invention is to provide an improved alternator, in which a cooling fan is easily connected to a rotor shaft at a right position in a simple process.

The alternator for use in an automotive vehicle includes a stator having an armature winding, a rotor having a pole core connected to a rotor shaft and a field winding wound on the pole core, a front and a rear housing, a cooling fan for generating cooling airflows, and other associated components. The stator is held between the front housing and the rear housing, while the rotor is rotatably supported inside the stator. The rotor is driven by an automotive engine via a pulley connected to the rotor shaft so that electric power is generated in the alternator.

The cooling fan having plural fan blades supported on a supporting plate and a center opening is positioned at a rear end of the pole core and coupled to the rotor shaft. A non-circular flange made of a resin material is formed on the rotor shaft. The non-circular flange is inserted into the center opening of the cooling fan, so that engaging edges of the center opening engage with the non-circular flange. In this manner, the cooling fan is coupled to the rotor shaft at a correct position both in the radial direction and in the rotational direction of the cooling fan. The engaging edges of the center opening are made asymmetrically with respect to the rotor shaft to prevent the cooling fan from being coupled to the rotor shaft at a wrong position in the rotational direction.

A fan base may be disposed between the end of the pole core and the cooling fan to rectify flow directions of cooling air. In this case, the fan base may be coupled to the rotor shaft in the same manner as the cooling fan, or may be mechanically connected to the cooling fan by welding or the like. Since the cooling fan is correctly positioned relative to the fan base, welding spots are automatically set. The structure for coupling the cooling fan positioned at the rear side to the rotor shaft may be applied also to the cooling fan positioned at the front side.

Since the cooling fan and the rotor shaft are coupled to each other by engaging the center opening of the cooling fan with the non-circular flange of the rotor shaft, the cooling fan can be correctly positioned relative to the rotor shaft both in the radial direction and in the rotational direction of the cooling fan. Accordingly, noises and vibrations due to rotational imbalance of the cooling fan are suppressed. No jig is required to couple the cooling fan to the rotor shaft at a correct position. Other objects and features of the present invention will become more readily apparent from a better understanding of the preferred embodiment described below with reference to the following drawings.

DETAILED DESCRIPTION OF THE PREFERRED EMBODIMENT

Figure 1:
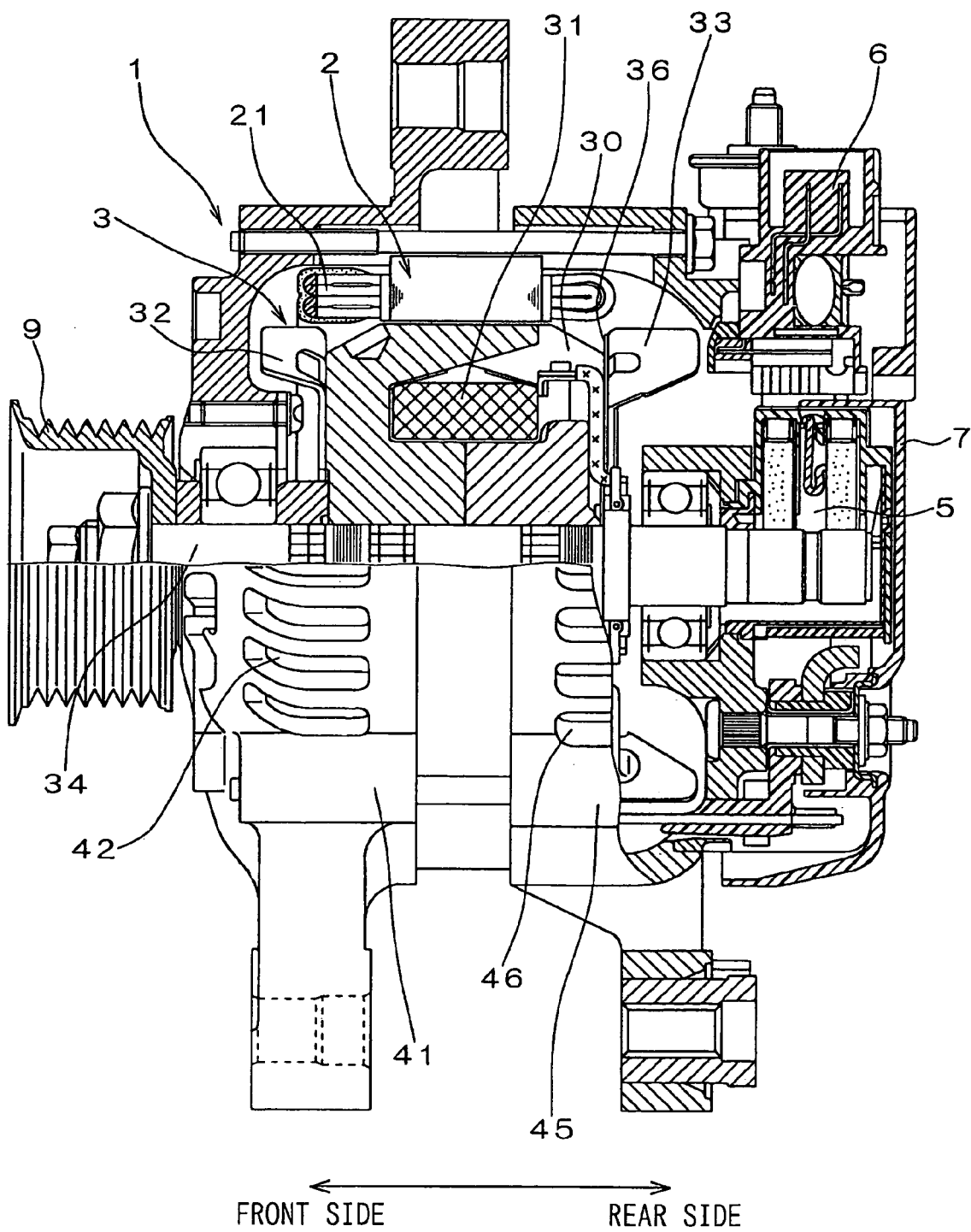
FIG. 1 is a cross-sectional view showing an automotive alternator having a cooling fan connected to a rotor shaft according to the present invention.

A preferred embodiment of the present invention will be described with reference to accompanying drawings. As shown in FIG. 1, an alternator 1 for use in an automotive vehicle is composed of: a stator 2 having an armature winding 21; a rotor 3 having a filed winding 31 wound on pole cores 30; a cooling fan 32 connected to the front side of the rotor; a cooling fan 33 connected to the rear side of the rotor; a fan base 36 disposed between an rear end of the pole core 30 and the cooling fan 33; a front housing 41; a rear housing 45; a brush device 5 for supplying electric current to the field winding 31; a voltage regulator 6 for controlling an output voltage to a predetermined voltage; a rear cover 7 covering and protecting the brush device 5 and the voltage regulator 6; a pulley 9 driven by an engine for driving the rotor 3; and other associated components.

The stator 2 is held between the front housing 41 and the rear housing 45, and the rotor 3 is rotatably supported inside of the stator 2. The pole cores 30 are firmly connected to a rotor shaft 34. The fan base 36 rectifies airflows generated by the cooling fan 33. The front housing 41 includes plural outlet windows 42 for blowing out cooling air generated by the front cooling fan 32 in the radial direction. Similarly, the rear housing 45 includes plural outlet windows 46 for blowing out cooling air generated by the rear cooling fan 33 in the radial direction.

Figure 2:
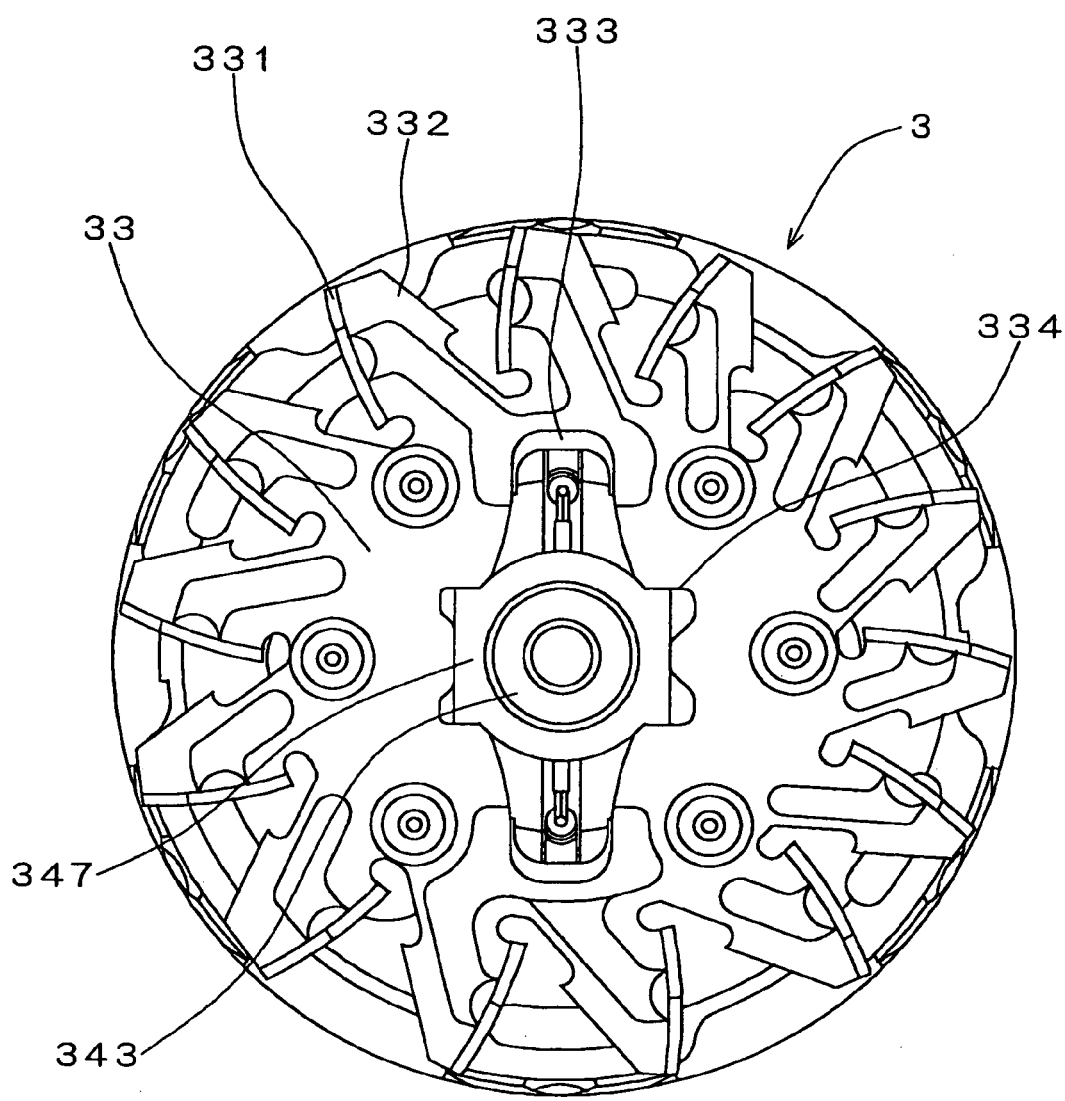
FIG. 2 is a plan view showing a rotor, viewed from the rear side of the alternator.
Figure 3:
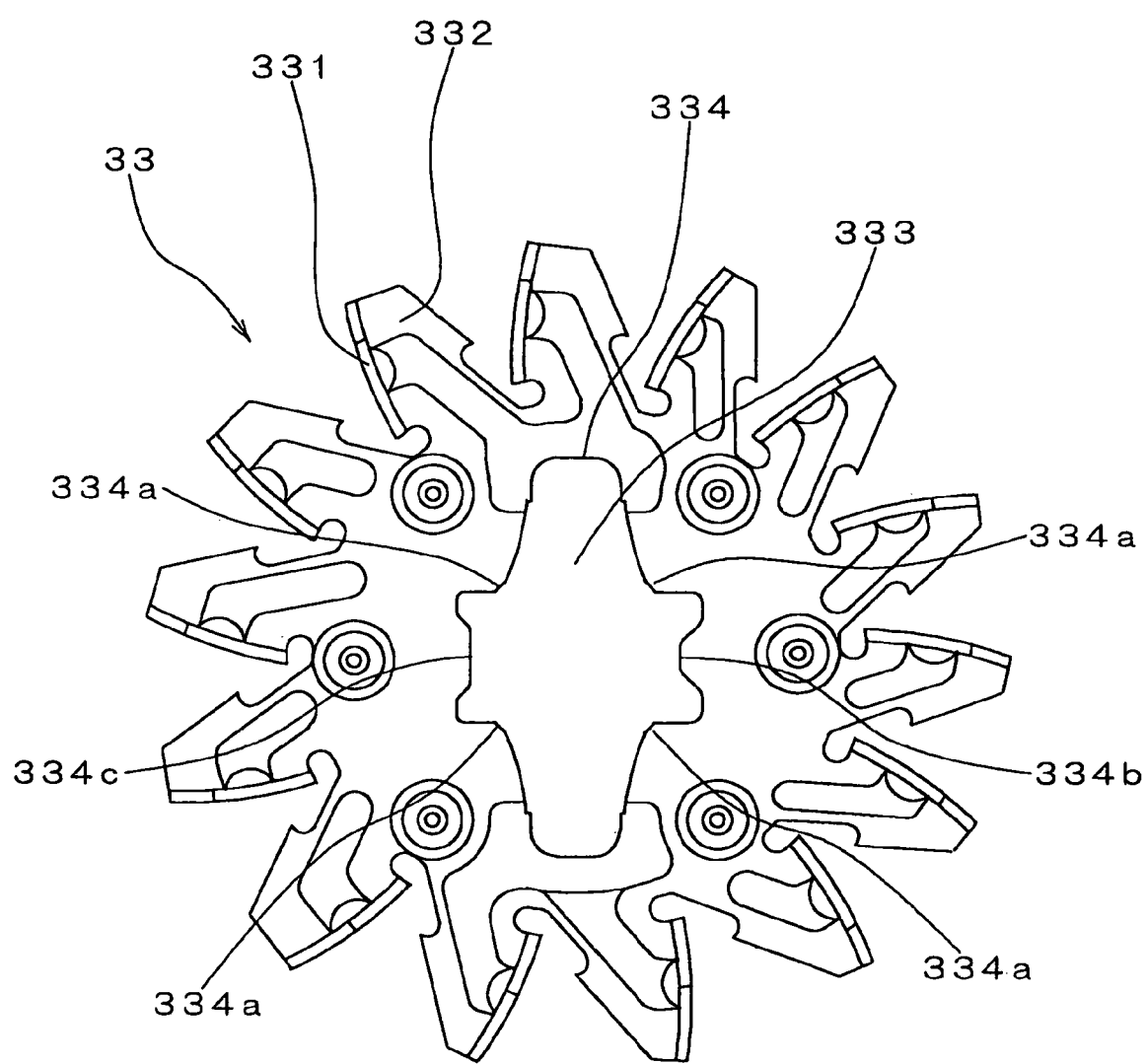
FIG. 3 is a plan view showing a cooling fan to be positioned at the rear side of the rotor.

The rear cooling fan 33 and the fan base 36, both connected to the rotor shaft 34, will be described in detail with reference to FIGS. 2–6. As shown in FIG. 3, the cooling fan 33 has 14 blades 331 formed at non-uniform intervals and a supporting plate 332 supporting the blades 331. Each blade extends in the axial direction from the supporting plate 332 and is reinforced by a projected rib connecting the blade 331 and the supporting plate 332. An opening 333 for inserting the rotor shaft 34 is formed at a center portion of the supporting plate 332. The opening 333 is referred to as a first opening when it is necessary to differentiate it from another opening 361 (referred to as a second opening) formed in the fan base 36. A non-circular flange 347 (explained later in detail) formed by a resin member 343 on the rotor shaft 34 is inserted into the opening 333, as shown in FIG. 2.

As shown in FIG. 3, the fringe 334 of the opening 333 is asymmetric with respect to the rotor shaft 34 to avoid that the cooling fan 33 is incorrectly coupled to the rotor shaft in the rotational direction. More particularly, the fringe 334 includes a large projection 334b and a small projection 334c, and these projections 334b, 334c prevent the cooling fan 33 from being coupled to the rotor shaft 34 at a position rotated by 180 degrees from a correct position. In other words, the large projection 334a interferes with a flat portion 349 (refer to FIG. 6) of the non-circular flange 347 when the cooling fan 33 is going to be coupled with the rotor shaft 34 at an incorrect position. The fringe 334 of the opening 333 also includes four engaging edges 334a with which the non-circular flange 347 of the rotor shaft 34 engages.

Figure 4:
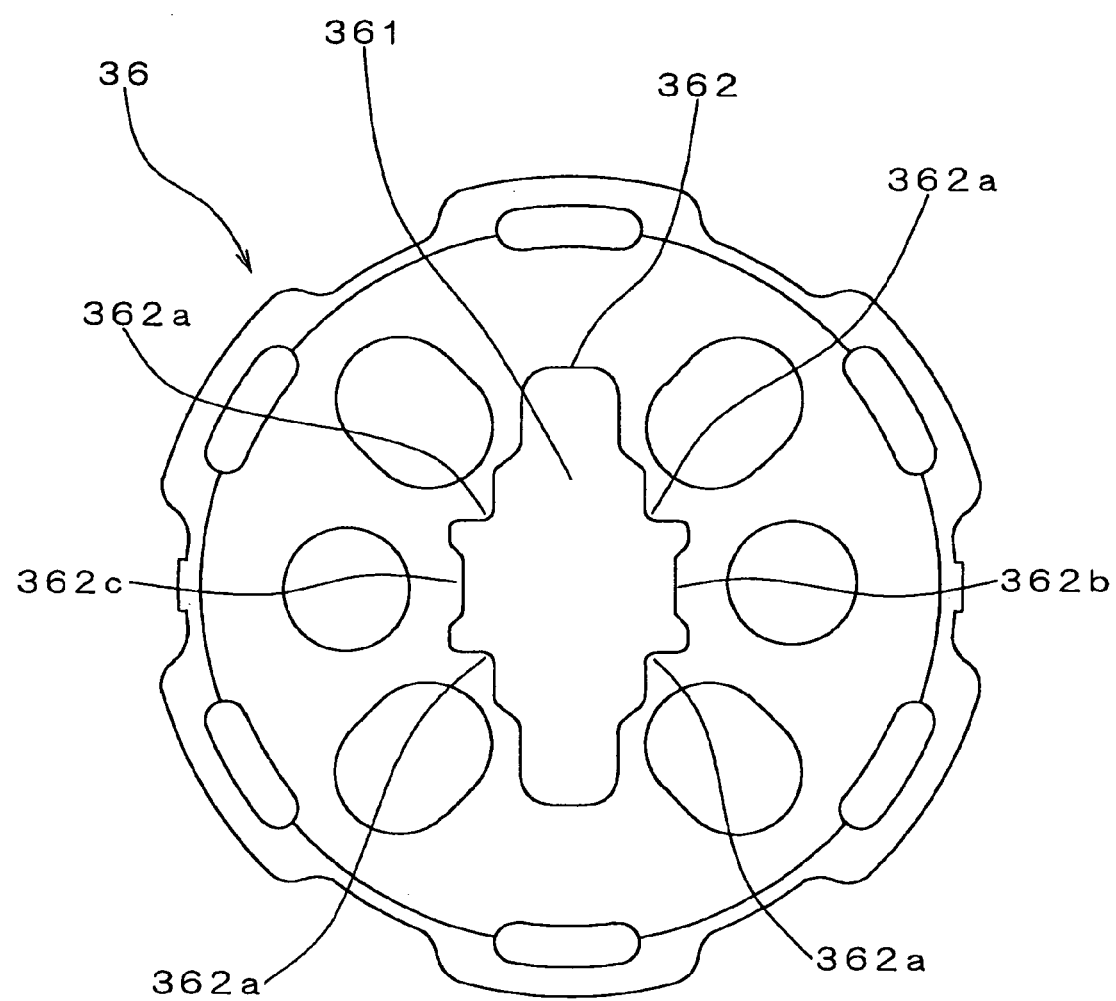
FIG. 4 is a plan view showing a fan base to be connected to the cooling fan.

The fan base 36 to be disposed between the rear end of the pole core 30 and the cooling fan 33 is shown in FIG. 4. In this particular embodiment, the fan base is mechanically connected to the cooling fan 33 by welding or the like. The fan base 36 has an opening 361 formed at its center portion. A fringe 362 of the opening 361 is formed symmetrically with respect to the rotor shaft 34 in this particular embodiment. That is, both projections 362b and 362c have the same size, unlike those of the cooling fan 33. However, both projections 362b, 362c may be asymmetrically formed when it is necessary to connect the fan base 36 to the rotor shaft 34 at a particular position in the rotational direction. The fringe 362 includes four engaging edges 362a with which the non-circular flange 347 of the rotor shaft 34 engages.

Figure 5:
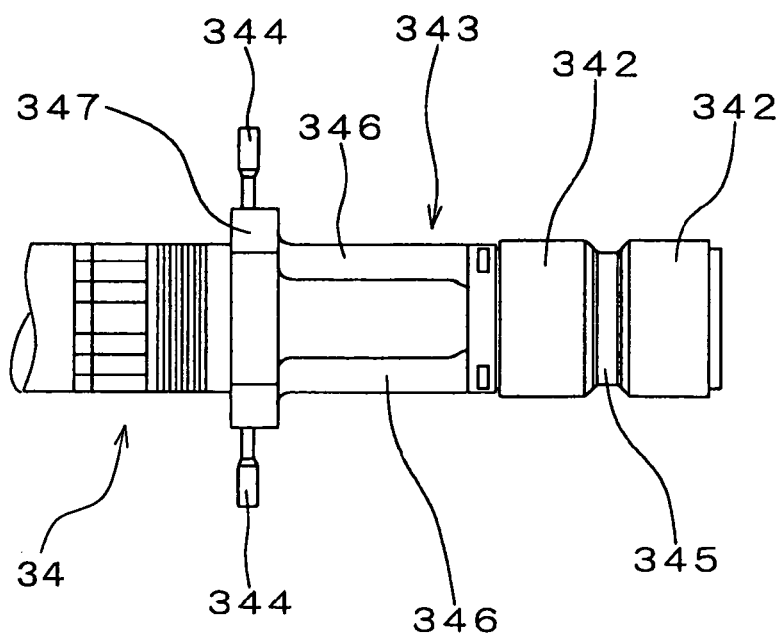
FIG. 5 is a side view partially showing a rotor shaft to which the cooling fan is connected.
Figure 6:
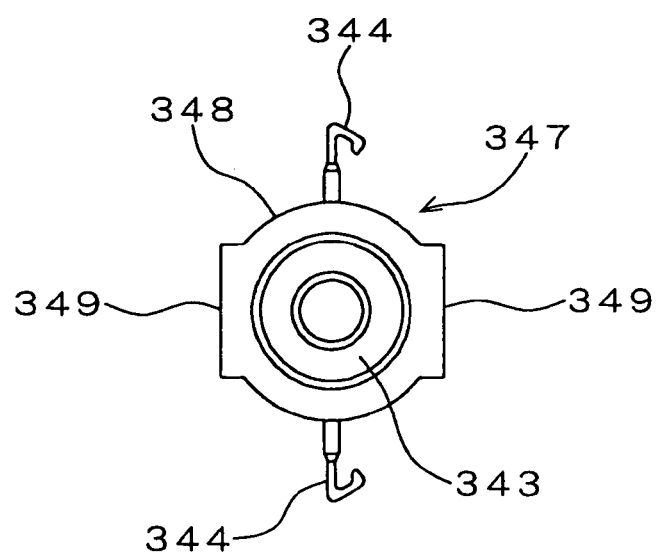
FIG. 6 is a plan view showing the rotor shaft, viewed from the rear side of the alternator.

With reference to FIGS. 5 and 6, an rear end portion of the rotor shaft 34 will be described. As shown in FIG. 5, the slip-ring 342 consisting of two portions insulated by an insulating portion 345 is connected to the rear end of the rotor shaft 34 by means of a resin member 343. The resin member 343 including leg portions 346 and a non-circular flange 347 is formed on the rotor shaft 34. A pair of connecting terminals 344 are embedded in the non-circular portion 347 of the resin member 343.

The pair of connecting terminals 344 electrically connects the slip-ring 342 to the field winding 31. The non-circular flange 347 includes a pair of flat portions 349 and a pair of round portions 348, as shown in FIG. 6. The non-circular portion 347 of the rotor shaft 34 is inserted into the opening 333 of the cooling fan 33 and the opening 361 of the fan base 36, and the cooling fan 33 and the fan base 36 are coupled to the rotor shaft 34 by making engagement between the openings 333, 361 and the non-circular flange 347. The flat portions 349 abut the fringes 334, 362 of the cooling fan 33 and the fan base 36.

The following advantages are attained in the present invention described above. Since the non-circular flange 347 of the rotor shaft 34 engages with the opening 333 of the cooling fan 33 and the opening 362 of the fan base 36, the cooling fan 33 is coaxially coupled to the rotor shaft 34 at a correct position in the rotational direction. Therefore, fan noises and vibration due to imbalance of the cooling fan 33 can be suppressed.

In the process of coupling the cooling fan 33 to the rotor shaft 34 at the correct position, no jig for correctly setting the relative position is required. The cooling fan 33 is easily coupled to the rotor shaft 34. Further, the cooling fan 33 is correctly positioned relative to the fan base 36 when both are engaged with the non-circular flange 347 of the rotor shaft 34. Therefore, the cooling fan 33 can be connected to the fan base 36 by welding at the correct position. Either the cooling fan 33 or the fan base 36 may be coupled to the non-circular flange 347 of the rotor shaft 34, and both may be connected to each other by welding.

The cooling fan 33 is simply structured, i.e., it is composed of plural fan blades 331 and a supporting plate 332 supporting the fan blades 331. Therefore, the cooling fan 33 can be easily manufactured. The opening 333 of the cooling fan 33 can be easily made by stamping or the like. Further, since the fringe 334 of the opening 333 is made asymmetrically with respect to the rotor shaft 34, the cooling fan 33 can be coupled to the non-circular flange 347 of the rotor shaft 34 at a correct position in the rotational direction without fail. Since the non-circular flange 347 is made as part of the resin member 343, its shape can be freely chosen. Since a pair of flat portions 349 are formed on the non-circular flange 347, the non-circular flange 347 can be correctly formed in a molding process by suppressing distortion.

The present invention is not limited to the embodiment described above, but it may be variously modified. For example, though the structure for coupling the cooling fan to the rotor shaft is applied to the cooling fan 33 at the rear side in the foregoing embodiment, the similar structure may be applied also to the cooling fan 32 at the front side. The present invention is also applicable to an alternator having no fan base. While the present invention has been shown and described with reference to the foregoing preferred embodiment, it will be apparent to those skilled in the art that changes in form and detail may be made therein without departing from the scope of the invention as defined in the appended claims.

What is claimed is:

1. An automotive alternator, comprising:
    a stator having an armature winding;
    a rotor having a field winding wound on a pole core and a rotor shaft to which the pole core is fixedly connected, the rotor being rotatably supported inside the stator;
    a cooling fan positioned at an axial end of the pole core; and a fan base for rectifying airflows generated by the cooling fan, the fan base being disposed between the axial end of the pole core and the cooling fan, wherein:

the rotor shaft includes a non-circular flange, and either the cooling fan or the fan base is coupled to the non-circular flange so that the cooling fan is correctly positioned relative to the rotor shaft both in a radial direction and in a rotational direction of the cooling fair;

the cooling fan includes a plurality of fan blades extending in the axial direction of the rotor and a supporting plate supporting the plurality of fan blades;

a first opening to which the non-circular flange of the rotor shaft is inserted is formed at a center portion of the supporting plate; and first engaging edges engaging with the non-circular flange are formed at a fringe of the first opening.

2. The automotive alternator as in claim 1, wherein:
the fringe of the first opening is formed asymmetrically with respect to the rotor shaft.

3. The automotive alternator as in claim 1, wherein:
the rotor shaft includes a slip-ring which brushes slidably contact, a resin member for supporting the slip-ring on the rotor shaft in an insulated manner, and connecting terminals for electrically connecting the slip-ring to the field winding, the connecting terminals being inserted and molded in the resin member; and
the non-circular flange is formed by the resin member.

4. The automotive alternator as in claim 3, wherein:
the resin member includes a pair of leg portions connecting the slip-ring and the non-circular flange to each other.

5. The automotive alternator as in claim 1, wherein:
the fan base is mechanically connected to the cooling fan.

6. An automotive alternator, comprising:
a stator having an armature winding;
a rotor having a field winding wound on a pole core and a rotor shaft to which the pole core is fixedly connected, the rotor being rotatably supported inside the stator; and
a cooling fan positioned at an axial end of the pole core, wherein:
the rotor shaft includes a non-circular flange, and the cooling fan is coupled to the non-circular flange so that the cooling fan is correctly positioned relative to the rotor shaft both in a radial direction and in a rotational direction of the cooling fan;
the cooling fan includes a plurality of fan blades extending in the axial direction of the rotor and a supporting plate supporting the plurality of fan blades;
a first opening to which the non-circular flange of the rotor shaft is inserted is formed at a center portion of the supporting plate; and
first engaging edges engaging with the non-circular flange are formed at a fringe of the first opening.

7. The automotive alternator as in claim 6, wherein:
the fringe of the first opening is formed asymmetrically with respect to the rotor shaft.

8. The automotive alternator as in claim 6, wherein:
the rotor shaft includes a slip-ring which brushes slidably contact, a resin member for supporting the slip-ring on the rotor shaft in an insulated manner, and connecting terminals for electrically connecting the slip-ring to the field winding, the connecting terminals being inserted and molded in the resin member; and
the non-circular flange is formed by the resin member.

9. The automotive alternator as in claim 8, wherein:
the resin member includes a pair of leg portions connecting the slip-ring and the non-circular flange to each other.

10. An automotive alternator, comprising:
a stator having an armature winding;
a rotor having a field winding wound on a pole core and a rotor shaft to which the pole core is fixedly connected, the rotor being rotatably supported inside the stator;
a cooling fan positioned at an axial end of the pole core; and
a fan base for rectifying airflows generated by the cooling fan, the fan base being disposed between the axial end of the pole core and the cooling fan, wherein:
the rotor shaft includes a non-circular flange, and either the cooling fan or the fan base is coupled to the non-circular flange so that the cooling fan is correctly positioned relative to the rotor shaft both in a radial direction and in a rotational direction of the cooling fan;
the cooling fan includes a plurality of fan blades extending in the axial direction of the rotor and a supporting plate supporting the plurality of fan blades;
a second opening to which the non-circular flange of the rotor shaft is inserted is formed at a center portion of the fan base; and
second engaging edges engaging with the non-circular flange are formed at a fringe of the second opening.

11. The automotive alternator as in claim 10, wherein:
the fringe of the second opening is formed asymmetrically with respect to the rotor shaft.

* * * * *